United States Patent
Mariano et al.

(10) Patent No.: US 7,903,141 B1
(45) Date of Patent: Mar. 8, 2011

(54) METHOD AND SYSTEM FOR EVENT DETECTION BY MULTI-SCALE IMAGE INVARIANT ANALYSIS

(75) Inventors: Vladimir Mariano, Laguna (PH); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 1424 days.

(21) Appl. No.: 11/353,264

(22) Filed: Feb. 14, 2006

Related U.S. Application Data

(60) Provisional application No. 60/653,171, filed on Feb. 15, 2005.

(51) Int. Cl.
*H04N 7/18* (2006.01)
*G06K 9/00* (2006.01)

(52) U.S. Cl. .......................... 348/143; 348/154; 382/103
(58) Field of Classification Search .................. None
See application file for complete search history.

(56) References Cited

U.S. PATENT DOCUMENTS

| | | | | |
|---|---|---|---|---|
| 5,223,701 | A * | 6/1993 | Batterman et al. | 235/494 |
| 5,465,115 | A | 11/1995 | Conrad et al. | 348/155 |
| 5,684,898 | A | 11/1997 | Brady et al. | 382/282 |
| 5,748,775 | A | 5/1998 | Tsuchikawa et al. | 382/190 |
| 6,546,115 | B1 | 4/2003 | Ito et al. | 382/100 |
| 6,625,310 | B2 | 9/2003 | Lipton et al. | 382/173 |
| 7,068,842 | B2 * | 6/2006 | Liang et al. | 382/181 |
| 7,298,394 | B2 * | 11/2007 | Kamijo et al. | 348/149 |
| 2002/0047907 | A1 * | 4/2002 | Chen et al. | 348/222 |
| 2003/0107649 | A1 * | 6/2003 | Flickner et al. | 348/150 |
| 2003/0179294 | A1 * | 9/2003 | Martins | 348/157 |
| 2005/0157169 | A1 * | 7/2005 | Brodsky et al. | 348/143 |

OTHER PUBLICATIONS

S. McKenna, S. Jabri, Z. Duric, and H. Wechsler, "Tracking interacting people", Proceedings of 4th IEEE Int'l Conference on Automatic Face and Gesture Recognition, pp. 348-353, Mar. 2000.
K. Toyama, J. Krumm, B. Brumitt, and B. Meyers, "Wallflower: Principles and Practice of Background Maintenance", Proceedings of 7th IEEE Int'l Conference on Computer Vision, pp. 255-261, Sep. 1999.
C. Stauffer and W. Grimson, "Learning Patterns of Activity Using Real-Time Tracking", IEEE Transactions on Pattern Analysis and Machine Intelligence, pp. 747-757, vol. 22, Aug. 2000.
I. Haritaoglu, D. Harwood, and L. Davis, "W4: Real-Time Surveillance of People and Their Activities", IEEE Transactions on Pattern Analysis and Machine Intelligence, pp. 809-830, vol. 22, Aug. 2000.

* cited by examiner

*Primary Examiner* — Sinh Tran
*Assistant Examiner* — Albert H Cutler

(57) ABSTRACT

The present invention is a method and system for detecting scene events in an imaged sequence by analysis of occlusion of user-defined regions of interest in the image. The present invention is based on the multi-scale groups of nearby pixel locations employing contrast functions, a feature that is invariant to changing illumination conditions. The feature allows the classification of each pixel location in the region of interest as occluded or not. Scene events, based on the occlusion of the regions of interest, are defined and subsequently detected in an image sequence. Example applications of this invention are automated surveillance of persons for security, and automated person counting, tracking and aisle-touch detection for market research.

22 Claims, 9 Drawing Sheets

METHOD AND SYSTEM FOR EVENT DETECTION BY MULTI-SCALE IMAGE INVARIANT ANALYSIS

CROSS-REFERENCE TO RELATED APPLICATIONS

This application claims the benefit of U.S. provisional patent application Ser. No. 60/653,171, filed Feb. 15, 2005 by the present inventors.

FEDERALLY SPONSORED RESEARCH

Not Applicable

SEQUENCE LISTING OR PROGRAM

Not Applicable

BACKGROUND OF THE INVENTION

1. Field of the Invention

The present invention relates to processing of image sequences for use in detecting events that occur in a scene; in particular the invention deals with analysis of user-defined areas in the image sequence to detect transient objects, especially persons, and their activity in the scene.

2. Background of the Invention

Automatic detection of objects in a scene is an important problem with many applications. The popularity of image-capturing devices attached to computers has made it possible to use image analysis to detect objects in a scene. One approach is to model the transitions between the background scene and foreground objects. U.S. Pat. No. 5,465,115 by G. Conrad, B. Denenberg and G. Kramerich, disclosed a method for counting people walking through a restricted passageway, such as a door. Using the image taken from an overhead video camera, a narrow image window perpendicular to the traffic flow is analyzed. This narrow image is divided into short image segments, called "gates", which are points of detection. The thresholded differences of these gate images across consecutive frames are used to detect persons crossing the gate. Since the gates' widths are small, one passing person would occlude several contiguous gates. The method depends heavily on the speed of the moving objects; they have to be fast enough to record significant frame-to-frame differences. The event of one person passing can even register several significant differences. Certainly, the method would not work if a person stops in the location of the window.

The more popular approach using image analysis is to create a model of the image of the background scene and classify regions in a scene's image as either background or foreground, which is the object region. Many computer vision systems use a background image model to detect and track objects in an imaged scene. The idea is to have a system that maintains a model of the background, which is the scene without any objects in it. This model can be an image of the background or some statistics of its sub-images. Whenever a small region of an input image is significantly different from the corresponding region in the background model, the location of that region is tagged as foreground, which means part of an object region. Spatial and temporal post-processing techniques refine the localization of the object region.

In the work of S. McKenna, S. Jabri, Z. Duric, and H. Wechsler, "Tracking interacting people", Proceedings of 4th IEEE Int'l Conference on Automatic Face and Gesture Recognition, pp. 348-353, March 2000, each color pixel in the background image is modeled as separate Red, Green, and Blue Gaussians. Each has a mean and variance which are continuously adapted to account for slow changes in outdoor illumination. The corresponding pixel in an input image is considered foreground if its value is a few standard deviations away from the mean. Gaussian models for chromaticity and gradient are added to classify object shadows as part of the background.

Instead of maintaining the distribution parameters for each pixel, K. Toyama, J. Krumm, B. Brumitt, and B. Meyers, "Wallflower: Principles and Practice of Background Maintenance", Proceedings of 7th IEEE Int'l Conference on Computer Vision, pp. 255-261, September 1999, maintains the past values of the pixel and uses a linear function to predict the value of the background pixel in the next frame. If the pixel in the next frame deviates significantly from its predicted value, then it is considered foreground.

The gradual and sometimes sudden changes in scene illumination, plus the problem of slow-moving objects, require a more complex model for each background pixel value. C. Stauffer and W. Crimson, "Learning Patterns of Activity Using Real-Time Tracking", IEEE Transactions on Pattern Analysis and Machine Intelligence, pp. 747-757, Vol. 22, August 2000, proposed multiple, adaptive Gaussians to model to each pixel. Multiple Gaussians are maintained for the background, and pixels that do not match any one of these Gaussians are considered foreground.

In the work of I. Haritaoglu, D. Harwood and L. Davis, "W4: Real-Time Surveillance of People and Their Activities", IEEE Transactions on Pattern Analysis and Machine Intelligence, pp. 809-830, Vol. 22, August 2000, each background pixel is represented by three values: its minimum, its maximum and maximum frame-to-frame intensity difference during a training period. This initial training period of about 20 to 40 seconds is when the background model is initially learned, which takes place even when objects are moving around the scene. This method is designed for scenes where an object cannot stay in one place very long. Otherwise, it will be included as part of the background. One such situation is when a car stops in the middle of the scene and stays there for minutes.

U.S. Pat. No. 5,748,775 by M. Tsuchikawa, A. Sato, A. Tomono and K. Ishii, disclosed a method for continuous reconstruction of the background image for background subtraction. A temporal histogram is maintained for each pixel and a statistical method is applied to determine whether the temporal changes are due to abrupt or gradual illumination changes. Background pixels are updated using statistics of the past values, computed from the temporal histogram.

Instead of working with the whole image of the background, U.S. Pat. No. 6,546,115 by W. Ito, H. Yamada and H. Ueda, disclosed a method wherein the image view is divided into several sub-views, each of which has a maintained background image of the sub-view. The system is used for detecting objects entering the scene. Each sub-view is processed independently, with the system detecting movement in the sub-view by computing the intensity differences between the input sub-image and the corresponding background sub-image. If an object is detected in a sub-view, then the corresponding background sub-image is not updated, otherwise it is updated.

Dividing the background image into several sub-images is also employed in U.S. Pat. No. 5,684,898 by M. Brady and D. Cerny, which disclosed a method for distinguishing foreground from background pixels in an input image for background subtraction. A weighting function takes the difference between pixel intensities of the background sub-image and that of the corresponding pixels in the input sub-image, and the weights are used to classify pixels in the input sub-image. If a background sub-image is not significantly different from the current input sub-images, it is updated. The method would work well if the objects are constantly moving in the scene.

U.S. Pat. No. 6,625,310 by A. Lipton, et al, utilizes statistical modeling of pixels to segment a video frame in background and foreground. Each pixel has a statistical model for the background. Corresponding pixels of incoming video frames are tested against the background model. If the value of the current pixel does not match the background model then it is considered as foreground.

The main idea behind the image-based methods of background subtraction is that a point location in the scene is classified as occluded by a foreground object if its pixel value in the input frame is significantly different from the expected value in the background model. The model is initially learned from an image sequence and continuously updated in order to adapt to gradual changes in scene illumination.

These methods suffer from problems resulting in the corruption of the background model. A requirement of these methods is that objects should be constantly moving so as not to occlude parts of the background for long periods of time. When an object stays too long in one location, then the history of past values or their distribution becomes significantly different from that of the true background. Furthermore, when an object is in one location and the ambient illumination changes drastically, then the background model in that location could be permanently corrupted, even if the object moves later and exposes the background.

The root of these problems lies in the difficulty of modeling the value of a background pixel over time. The value of a pixel is not stable over a wide range of imaging conditions, especially outdoors where intensity values can gradually or drastically change and have a wide range across different times of the day and varying weather conditions. Image-capturing devices, particularly those that employ auto-exposure, also contribute to the variability of the pixel value.

Contrasts between pairs of pixels, however, are much more stable under varying illumination conditions than a pixel's value. When the ambient illumination brightens or darkens the scene, the values of individual pixels would change significantly. However, given two pixel locations A and B with a small distance between them, the contrast between A and B does not change much, even if the individual values of A and B would increase or decrease significantly. The fact that the brightness of A changes together with the brightness of B results in a stable contrast between the two.

When an object moves into the scene and occludes the pixel location C but does not occlude that of B, the result is a big change in the contrast of pixels C and B. Thus, the contrast between C and B serves as one "micro-signature" of pixel C in the background scene. The ability to detect the occlusion of C by a foreground object, plus the stability under lighting changes, makes the two-pixel contrast an effective detection feature that is invariant to changing illumination conditions.

The idea of a pair of pixels is extended to a group of nearby pixel locations around a central pixel location C. The group is arranged in a circular configuration and has a certain radius R, with each pixel having a distance R from pixel location C. A contrast function can be defined, which uses the values of pixels in the group and computes the contrast of each value with that of pixel location C. The contrast function and a classification criterion determine if pixel location C is occluded by a transient object. The classification criteria compares the value of the contrast function with its expected value for the non-occluded background. That expected value is computed from a reference background image that is computed over a learning period.

The idea is further extended to multiple groups of pixels around C, where each group is arranged in a circular configuration with a different radius. The multi-scaled groups in circular configurations will ensure that the occlusion of pixel location C is detected, regardless of the size of the occluding object. These groups of pixels, together with their contrast with pixel location C, would be called a "multi-scaled invariant" defined for a single pixel location C.

A region of interest, composed of a group of contiguous pixel locations, can be defined as any arbitrary shape that could be a line, a rectangle, or any closed polygon. Each pixel location in the region of interest has a classifier comparing the multi-scale invariant of the pixel location C in the current frame with the multi-scale invariant of the pixel location C in the computed reference background image. With a classifier for each pixel, it is therefore determined if the defined region of interest is occluded by a transient object and to find out what part of the region of interest is covered by the object. Multiple user-defined regions of interest in the imaged scene, together with states of occlusion over time, allow users to define scene events, or "occlusion events", that can be automatically detected by the system.

For the background scene, the multi-scale invariants are computed from the reference background image learned during a learning period. Once the multi-scale invariants are learned, the key advantage of the system is that the detection of region occlusion can be done per image, independent of the temporal information in the previous images in the image sequence. This is in contrast to the image-based techniques described in the prior art where information from previous images is used to detect occluding objects and to constantly update the background image model.

The present invention is described in the following section and illustrated by an exemplary embodiment together with its accompanying drawings.

SUMMARY

The present invention is a method and system for detecting scene events in an image sequence by analysis of occlusion of user-defined regions of interest in the image. A computer vision system with an image capturing device captures an image sequence of a scene. A reference background image is computed during a learning period.

Given an image in the image sequence, for each pixel location in the region of interest, a classification is performed to determine if the pixel location is currently occluded by a transient object such as a person. A contrast function computes the contrast of the pixel location's value with that of a nearby pixel location. The current value of the contrast function is compared to the corresponding value of the contrast function in the reference background image. Several groups of nearby pixel locations are defined around the pixel location, with each group arranged in a circular configuration. Each group has a different radius from the pixel location to reliably detect transient objects of different sizes.

A scene event is defined as a sequence of scene descriptions, where a scene description is the plurality of regions of interest, each with its state of occlusion. In the embodiment, a list of predefined scene events are defined in the system. Each scene event is manually defined when the system is initialized. When the system is running, the input is a sequence of images, and the system continuously checks if any of the scene events in the list has occurred. For any scene event that has occurred, the system responds appropriately.

The exemplary embodiment uses virtual lines as the user-defined regions and the occlusion of these virtual lines as the basis for defining and detecting scene events. The embodiment is an indoor system for counting people and analyzing customer behavior within an aisle section of a retail store. This embodiment illustrates the invention's possible use for market research and similarly for automated surveillance. Multiple virtual lines are defined by the user. All virtual lines can be used to detect people in certain spots. Some lines are used to count people crossing in one direction. A pair of virtual lines are used to detect a person in the aisle, determine which section of the aisle that person is in, and to detect the event that the person touches an item in the aisle.

DRAWINGS

Figures

DETAILED DESCRIPTION OF THE INVENTION

An embodiment is described which exemplifies the method and apparatus for event detection by multi-scale image invariant analysis. This embodiment demonstrates useful applications of the invention. The invention roughly consists of image capture, learning of multi-scale image invariant features, scene event definition, and scene event detection.

Figure 1:
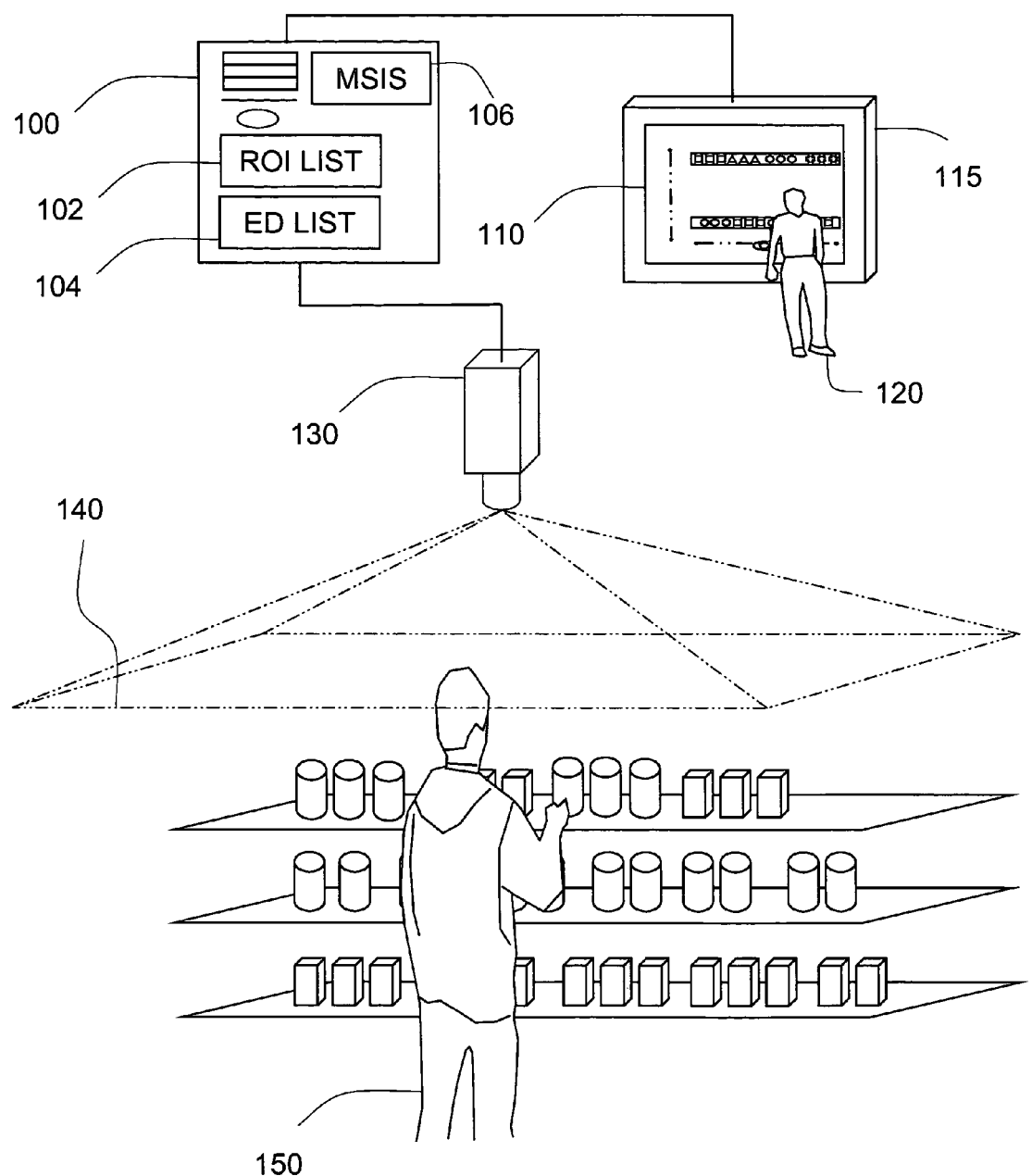
FIG. 1 is an overall view of an exemplary embodiment of the invention where the system is setup to detect scene events caused by persons' behavior in a retail store.

FIG. 1 shows the setup of the exemplary embodiment of the invention. A static image-capturing device 130 captures an image sequence of a view 140 of an indoor retail store. The scene shows a customer 150 examining a product on a shelf of a store aisle. The image sequence is processed by an attached computer 100. In the computer's memory is a structure—the Multi-Scale Invariant Structure (MSIS) 106, and two lists— the Region of Interest List (ROI LIST) 102 and the Event Definition List (ED LIST) 104. An image display device called a "monitor-input" 115, attached to the computer, displays images 110 of the scene events happening in the scene. The monitor-input 115 has input capabilities where a user 120 can select or mark points on the displayed image 110. User input is used for the manual specification of the regions of interest and the manual specification of the scene events.

Figure 2:
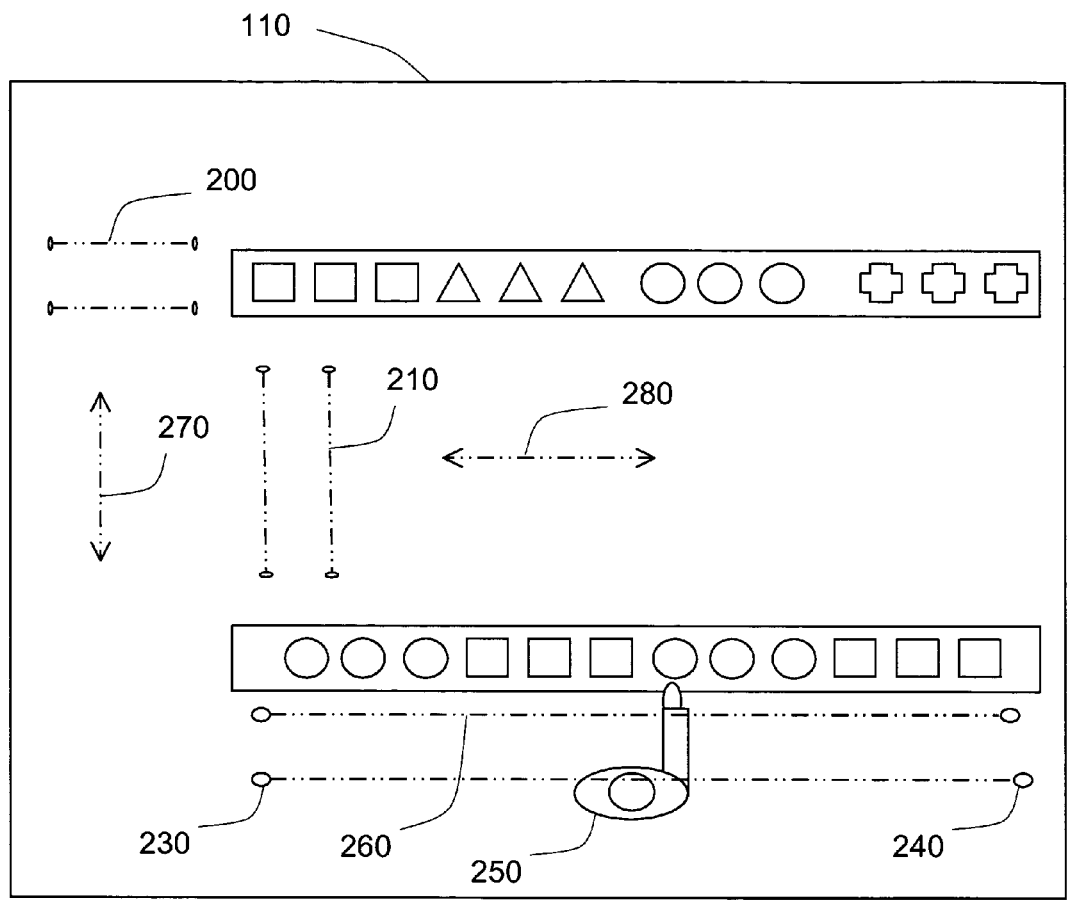
FIG. 2 is an illustration of the image captured by the image-capture setup in FIG. 1 and the specification of virtual lines for scene event detection.

FIG. 2 shows a captured image 110 displayed in the monitor input (115 in FIG. 1). The person in the retail store aisle (150 in FIG. 1) is visible from the overhead view (250 in FIG. 2). The user has defined several virtual lines as regions of interest to detect scene events. A pair of virtual lines 200 is used to count people passing through the main aisle in any direction 270. Another pair of virtual lines 210 is used to count the number of persons who entered or exited 280 one of the small aisles. A long virtual line 230 240 is used to determine the position of the person 250 within the length of the aisle. Finally, a virtual line 260 close to the shelf items is used to detect whether the person has touched an item on the shelf. The user (120 in FIG. 1) specifies a virtual line by marking two endpoints (e.g. 230 and 240) on the monitor input (115 in FIG. 1).

Figure 3:
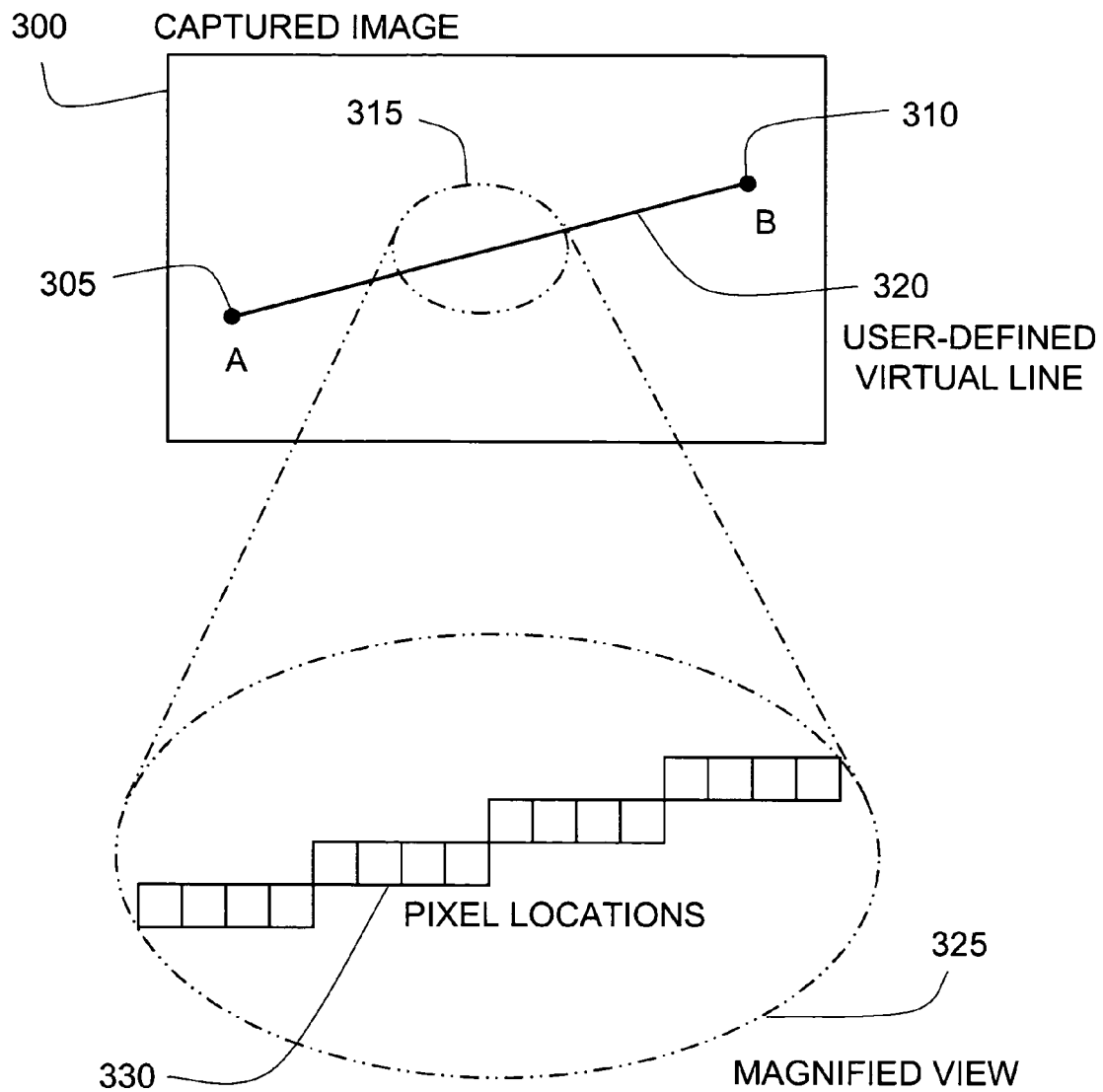
FIG. 3 is an illustration showing how a virtual line is specified and showing its composition as a contiguous set of pixel locations.

FIG. 3 shows how a virtual line is specified and shows its composition as a contiguous set of pixel locations. Given a captured image 300, a user defines a virtual line 320 which is specified by two endpoints A 305 and B 310. A portion 315 of the virtual line is magnified 325. The virtual line is composed of a contiguous set of pixel locations 330.

Figure 4:
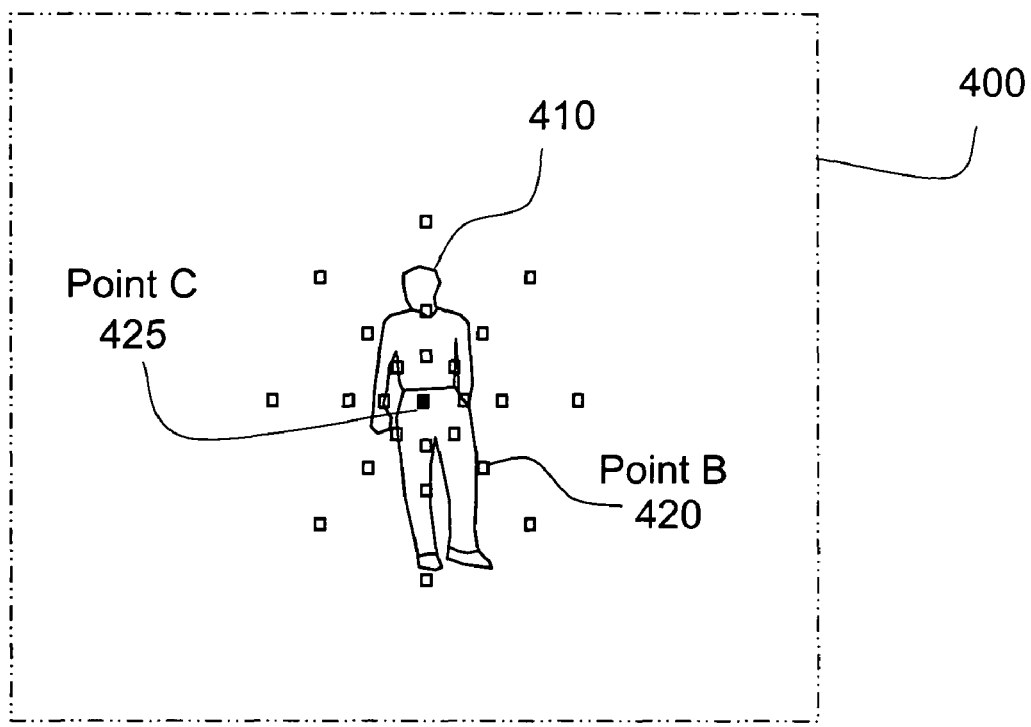
FIG. 4 is an illustration of a pixel location and the multiple groups of nearby pixel locations working to detect the occlusion by objects of different sizes.
Figure 4:
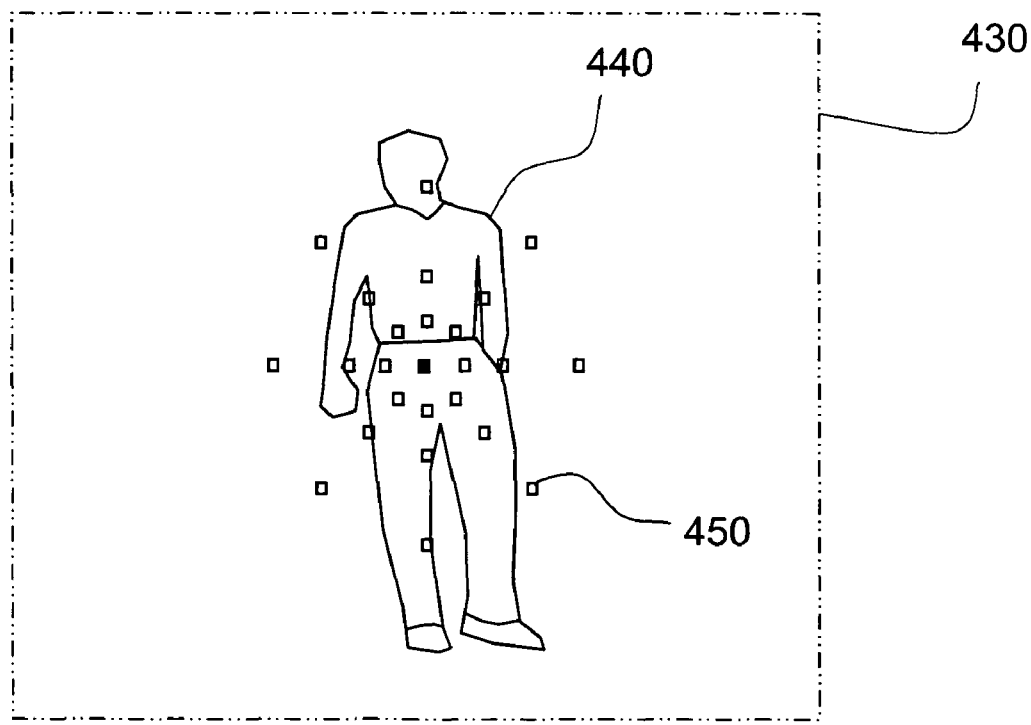

FIG. 4 illustrates the pixel location and the multiple groups of nearby pixel locations working to detect the occlusion by objects of different sizes. The top image 400 shows a pixel location C 425 occluded by a person 410. Several groups of nearby pixel locations are formed around pixel location C, each group arranged in a circular configuration with a given radius. Each circular configuration, having a different radius, is defined as having a different scale. A lower scale means the configuration has a smaller radius.

At the heart of the invention is the method of classifying pixel location C as occluded or not. At a given scale, a contrast function, such as the contrast ratio between the pixel value at pixel location C 425 and that of nearby pixel B 420 in a group, is learned over an image sequence to determine its stable value for the reference background image. The stable value of the ratio can be learned using a statistical technique such as a mixture of Gaussian distributions computed from the accumulation of ratios over time. Another statistical technique is a clustering of the time-accumulated ratios followed by an identification of large clusters which center around the value of the stable ratio. The mentioned reference background image is the image of the scene where there are no transient objects, such as persons. The contrast between pixel location C and nearby pixel location B for the reference image is then compared with the contrast between C and B in the current image in the image sequence. A significant difference between the two contrasts gives evidence that pixel location C is occluded. For a given group of nearby pixel locations in a circular configuration of a given radius around C, evidences for occlusion are accumulated using a voting scheme. When sufficient number of occlusion evidences are gathered, or sufficient votes for occlusion are cast, then pixel location C 425 is classified to be occluded by an object at the current scale.

The analysis is repeated for several groups in circular configurations, or at groups at multiple scales. If pixel C is classified to be occluded in the analysis of any of the configurations, then pixel location C is declared as occluded. The two images 400 and 430 image in FIG. 4 shows that the varying sizes of objects is the reason why the analysis is performed at multiple scales. In the captured image sequence, the sizes of objects varies due to many factors, including the angle of the image capturing device, the distance of objects from the device (i.e. perspective distortion), and the inherent variation of peoples' heights.

In image 400, analysis at a lower scale determines that pixel location C 425 is classified as occluded. The small person 410 covers the lower scales, while in image 430 the big person 440 covers the higher scales. At the highest scale 450, it is determined that pixel location C is occluded.

Given an input image from the image sequence, each pixel location in the virtual line (330 in FIG. 3) can therefore be classified as occluded or not. Grouping contiguous occluded points allows the system to determine if there is an object crossing the virtual line.

Multi-scale invariants are defined as the multiple groups of nearby pixel locations together with the value of their contrast with the pixel location.

Figure 5:
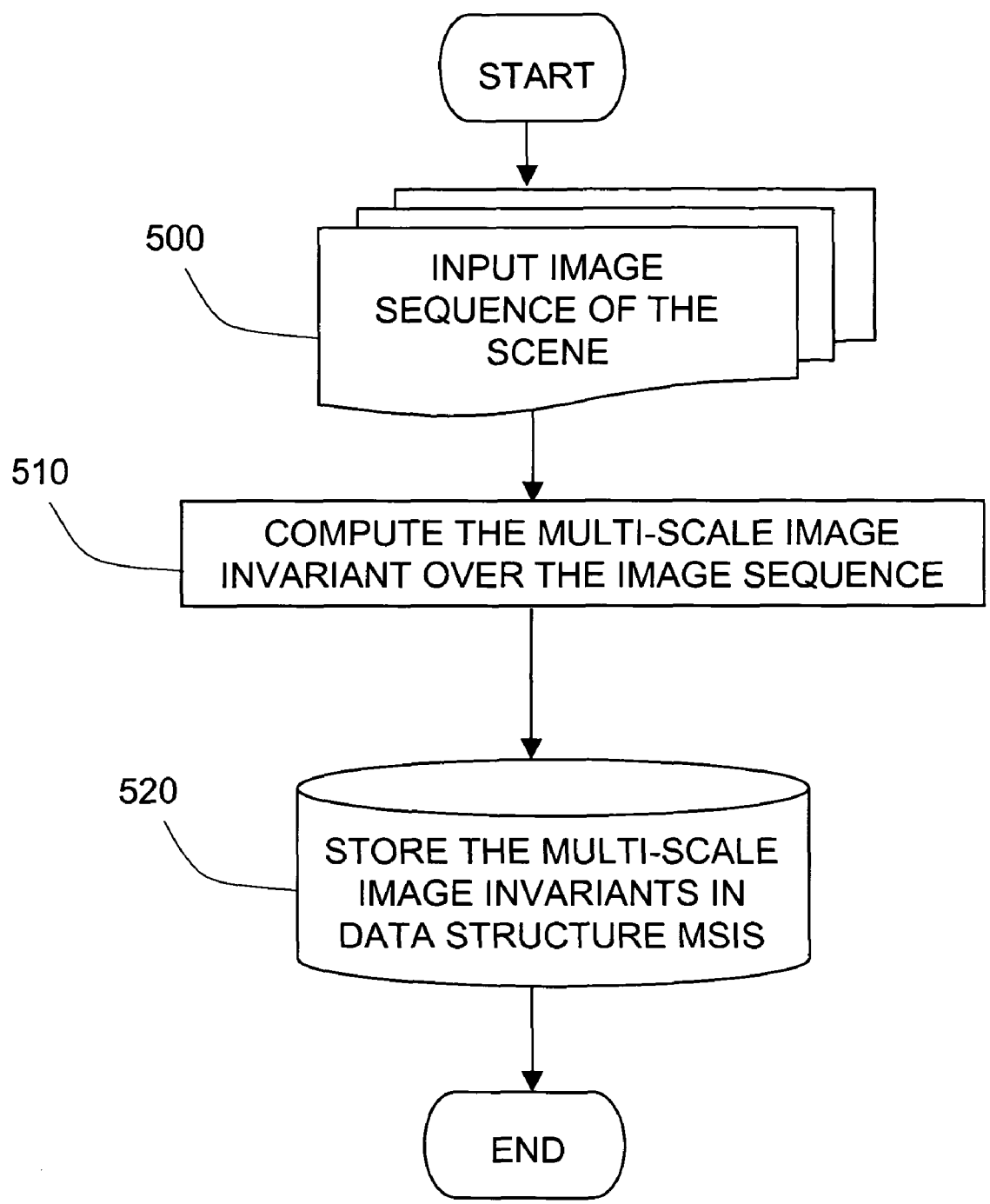
FIG. 5 is a flowchart showing the process of learning the multi-scale invariants for the reference background image.

FIG. 5 shows the process of learning the multi-scale invariants for the reference background image. The reference background image is the image of the scene where there are no persons present. The multi-scale invariant for each pixel location in the reference background image is computed from an input image sequence 500 from the image-capturing device. The image sequence is long enough such that any occasional passing person is ignored in the statistical learning. The stable values of the multi-scale image invariants are then computed 510 from the image sequence. The learned invariants are then stored in the Multi-Scale Invariant Structure (MSIS) 520.

Figure 6:
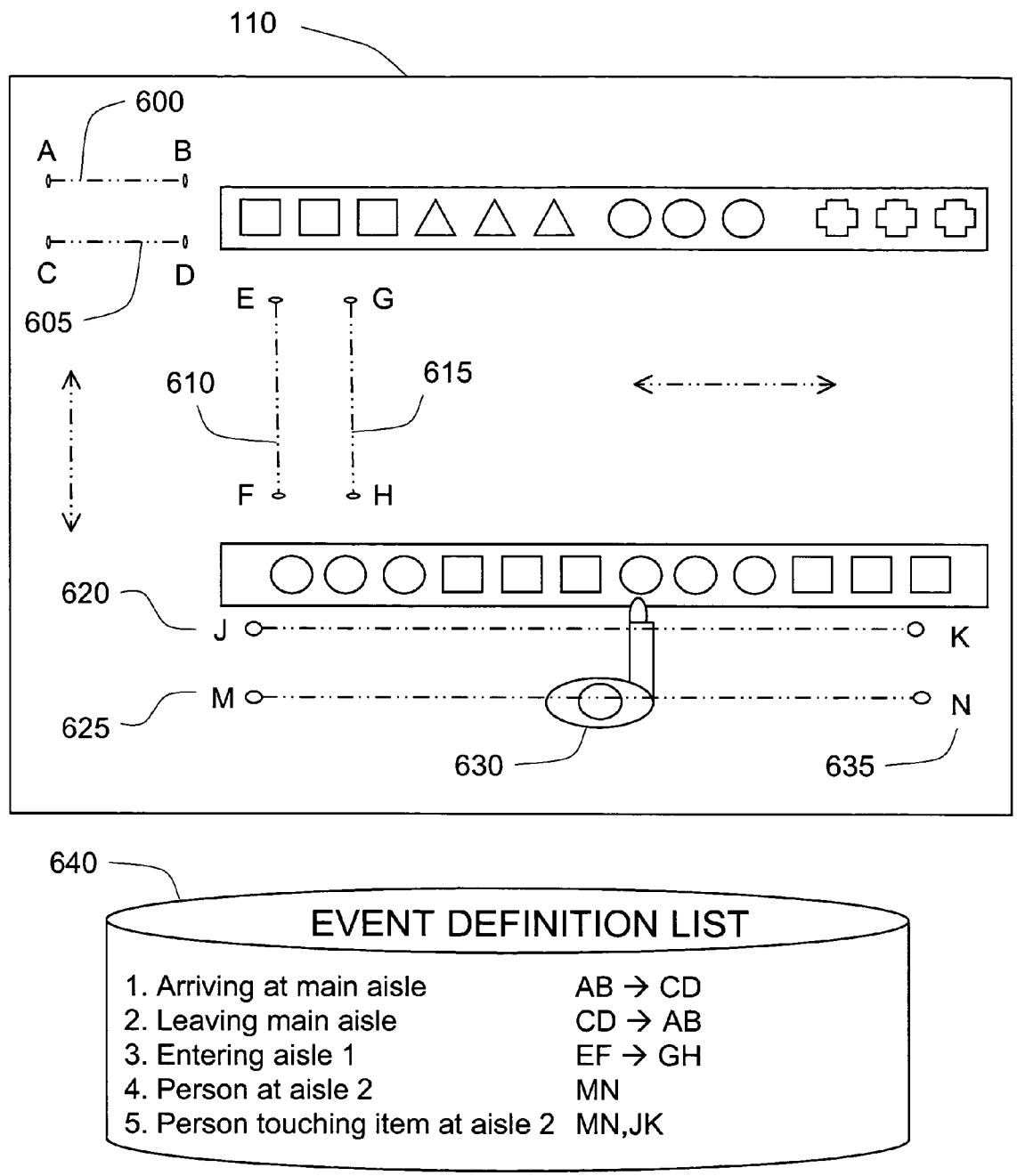
FIG. 6 is an illustration showing a sample of user-defined scene events.

FIG. 6 shows a sample of user-defined scene events. A scene event is composed of one or a series of scene descriptions, each of which can be manually modified or removed by the user. A scene description states which regions of interest are occluded or not occluded at one particular time. The image 110 is captured by the image-capturing device (130 in FIG. 1) and displayed in the monitor-input (115 in FIG. 1). The monitor-input is an interactive display where the user can specify regions of interest and change their state of occlusion in defining the scene descriptions. In this embodiment, the regions of interest are the virtual lines. Virtual lines AB 600 and CD 605 are used to count the number of persons passing through the main aisle. Another pair of virtual lines EF 610 and GH 615 is used to count the number of persons who entered or exited one of the small aisles. Virtual line MN 625 is used to determine the position of a person 630 within the length of the aisle. Virtual line JK 620 is used to detect whether the person has touched an item on the shelf. The scene events are stored in the Event Definition List (EDL) 640. The first scene event defined is the arrival of a person in the main aisle. This is defined as a sequence of two scene descriptions—the occlusion of line AB then the occlusion of virtual line CD. The second scene event is a person leaving the main aisle. This is defined as a sequence of two scene descriptions—occlusion of virtual line CD then the occlusion of virtual line AB. The third scene event is a person entering aisle 1, defined as crossing line EF then GH. The fourth scene event is the detection of a person in aisle 2, defined simply as a single scene description where a portion of MN is occluded. The fifth defined scene event is a person touching an item at aisle 2. This is defined as a conjunction of two scene descriptions—an occlusion of MN as well as a partial occlusion of line JK. Other scene events can be added to the list.

Figure 7:
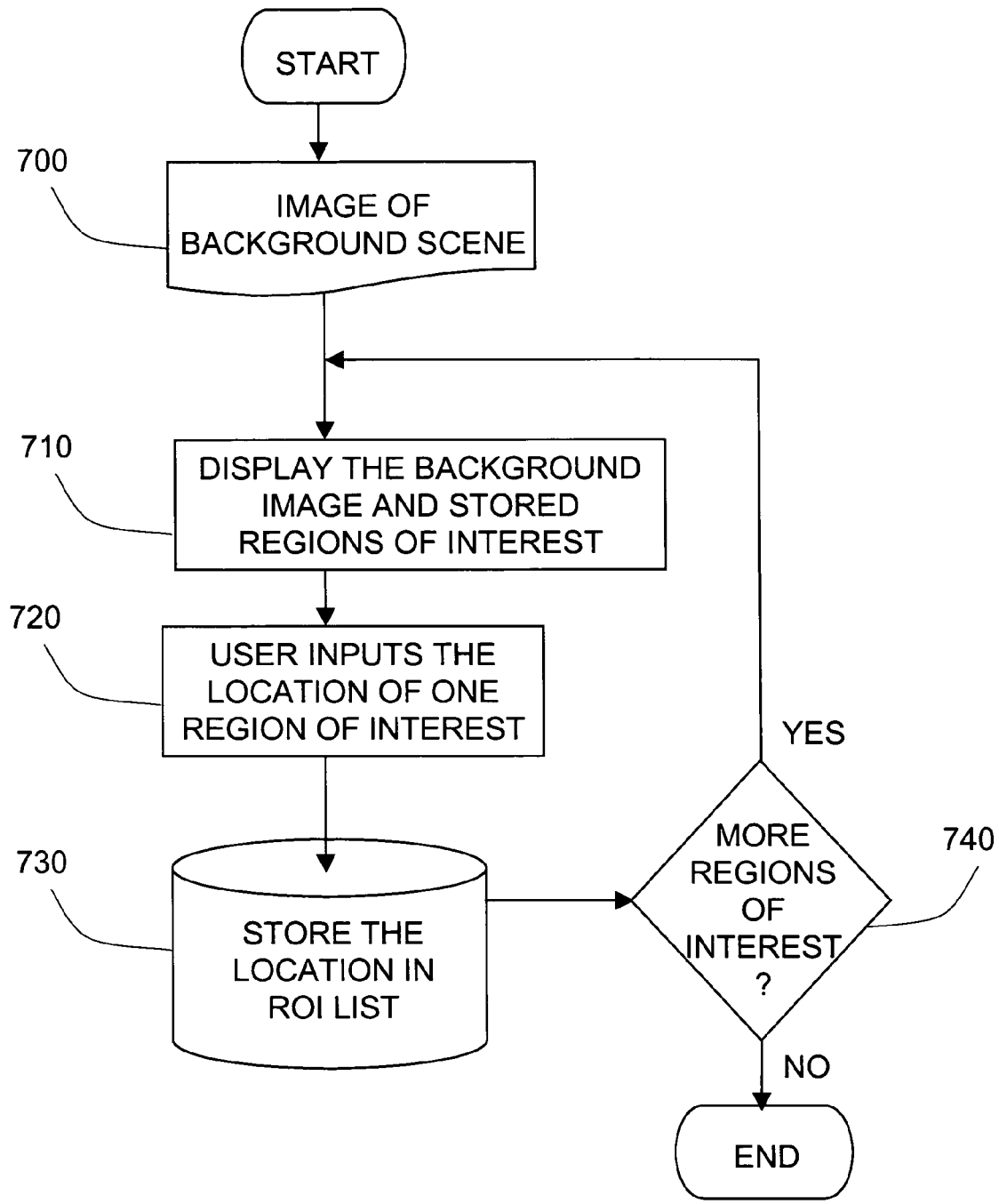
FIG. 7 is a flowchart showing the process of specifying several regions of interest.

FIG. 7 shows the process of specifying several regions of interest, such as virtual lines. The initial input is an image 700 of the background scene from the image-capturing device. This image is displayed 710 in the monitor-input (115 in FIG. 1) along with all the currently-defined regions of interest. The user then inputs new regions of interest 720, such as new virtual lines, on the displayed image. The new regions of interest are stored 730 in the Region Of Interest List (ROI LIST). Additional regions of interest can be further defined 740.

Figure 8:
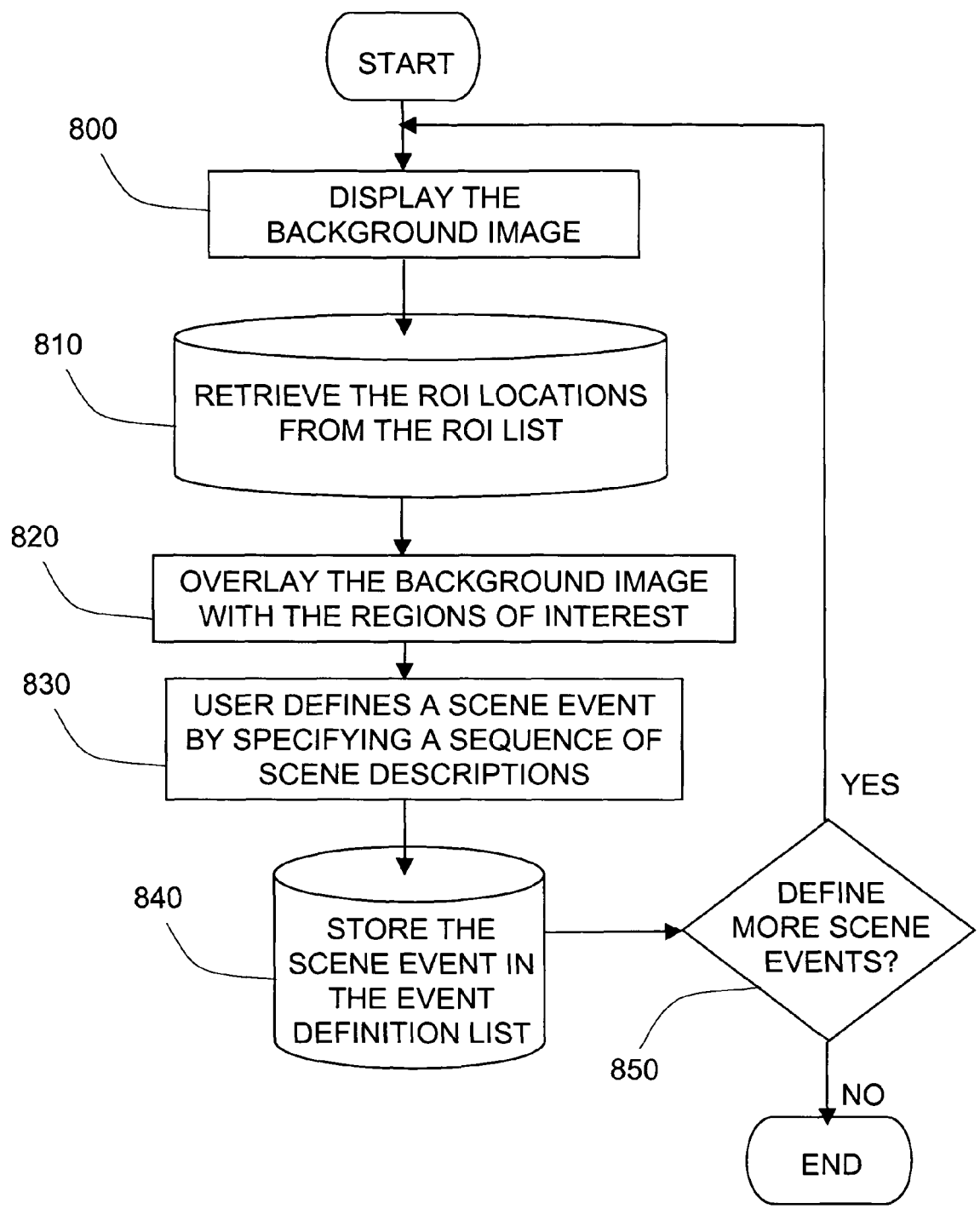
FIG. 8 is a flowchart showing the process of manually defining scene events.

Scene events are defined manually by specifying a sequence of scene descriptions. The user can add, change or remove scene descriptions in a scene event. It is assumed that all regions of interest are already defined. FIG. 8 shows the process starting with the display of the background image 800. The locations of all regions of interest are retrieved 810 from the ROI LIST and displayed 820 on the background image. The user defines a scene event by specifying a sequence of scene descriptions 830. A scene description is defined by marking each region of interest as occluded or not occluded. The sequence of scene descriptions is then stored 840 as a scene event in the event definition list. Additional scene events can be defined 850 by repeating the process.

Figure 9:
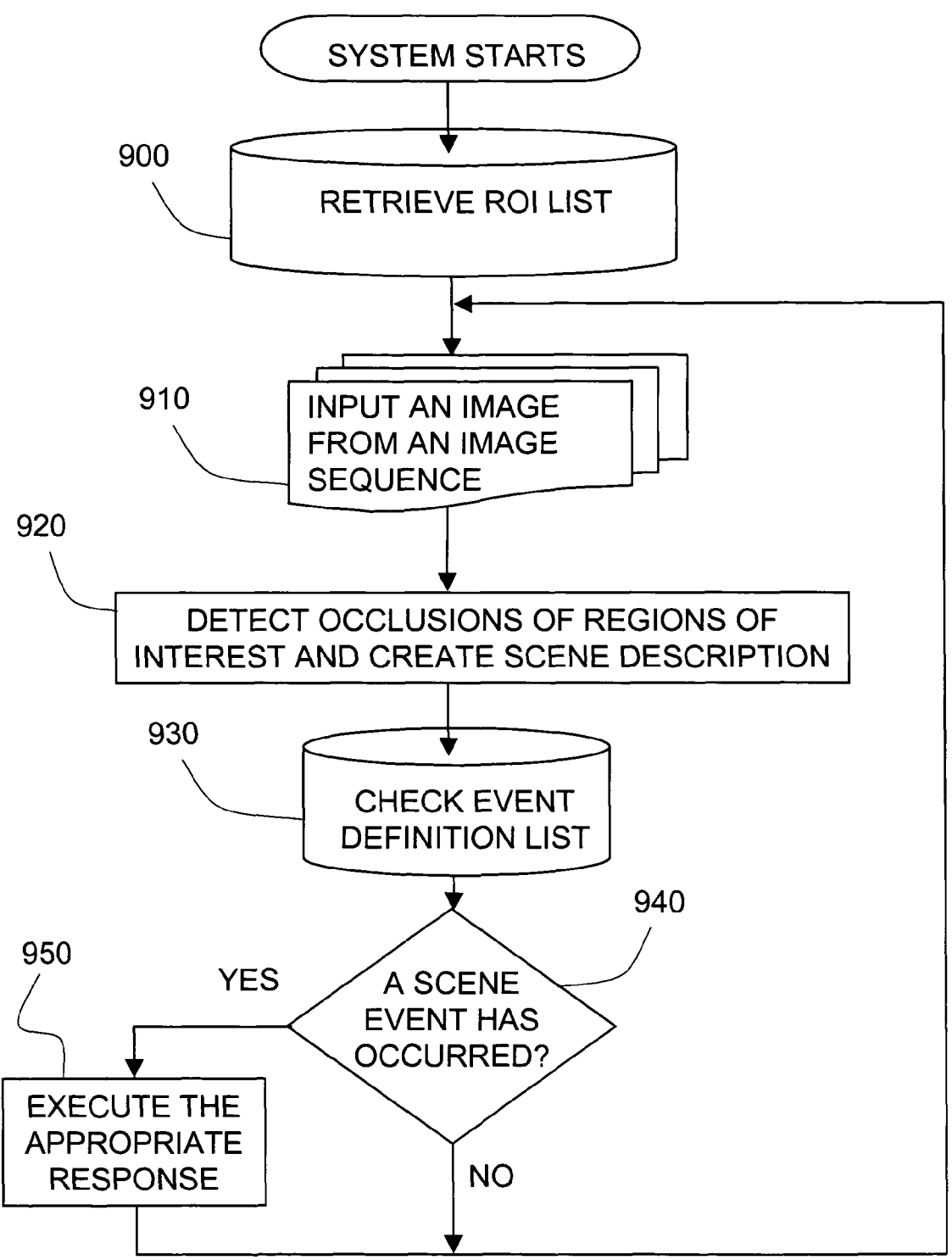
FIG. 9 is a flowchart showing how scene events are detected by the system.

FIG. 9 shows how scene events are detected by the system. It is assumed that all regions of interest are already defined in the ROI LIST and all scene events are defined in the Event Definition List. The locations of all regions of interest are retrieved 900 from the ROI LIST. The occurrence of scene events in an image sequence is detected by examining one image at a time. An image is fetched 910 from the image sequence. By comparing the multi-scale invariants of the current image with that of the reference background image, the system detects which regions of interest are occluded 920. Scene descriptions are formed from the detected occlusions. The recent history of scene descriptions in the image sequence are matched against the scene events defined in the Event Definition List 930. If any scene event has occurred 940, then the system executes an appropriate response 950. In the case of the virtual line, the scene event defined as a successive occlusion of two virtual lines causes the system to increment the count of persons entering an aisle in the retail store.

The exemplary embodiment, described in detail with the drawings and description, illustrates the use of the present invention in an application. The illustration is exemplary and not intended to be restrictive in character. The changes and modifications that come within the spirit of the invention are desired to be protected.

What is claimed is:

1. A method for detecting a scene event in an image sequence, comprising the steps of:

(a) generating a reference background image based on a multi-scale invariant analysis, wherein a multi-scale invariant is defined as multiple groups of pixel locations around a pixel location and the contrast between the pixel values of the multiple groups of pixel locations and the pixel value of the pixel location, wherein each group of pixel locations is arranged in a circular configuration with a different radius, (b) capturing an image sequence using an image capturing device, (c) specifying one or a plurality of regions of interest as a plurality of contiguous pixel locations in said image sequence, wherein each pixel location in the region of interest is associated with a classifier for the multi-scale invariant analysis, (d) performing a classification of each pixel location in said plurality of contiguous pixel locations as background or foreground, (e) defining a scene description as one or a plurality of said regions of interest each with its state of occlusion, (f) defining said scene event as a sequence of the scene descriptions occurring over an image subsequence, and (g) processing said image sequence to detect an occurrence of said scene event.

2. The method according to claim 1, wherein said step for performing a classification further comprises steps of:
(a) measuring the contrast of said pixel location with a group of nearby pixel locations, each having about the same constant distance from said pixel location, and
(b) comparing said contrast with the corresponding contrast in the reference background image computed during a learning period,
whereby said foreground is defined as an occlusion of said pixel location by a transient object including a person.

3. The method according to claim 2, wherein the method further comprises a step for arranging said group of nearby pixel locations in a circular configuration with a constant radius from said pixel location.

4. The method according to claim 1, wherein the method further comprises a step for applying a contrast function in the classification, wherein the contrast function takes a first pixel value at the pixel location and computes its contrast ratio with a second pixel value of a nearby pixel location of a group of nearby pixel locations and applying a threshold on the contrast ratio to perform the classification, whereby the contrast function enables a reliable said classification even with variations in lighting conditions.

5. The method according to claim 1, wherein the method further comprises a step for including multiple groups of pixel locations in the classification, with each group of pixel locations having a different distance from the pixel location,
wherein evidences for occlusion are accumulated using a voting scheme for each group of pixel locations,
whereby the multiple groups of pixel locations enable a reliable said classification even if the pixel location is occluded by any transient object of different sizes.

6. The method according to claim 1, wherein the method further comprises a step for performing the classification by a voting mechanism wherein each nearby pixel location of a group of nearby pixel locations votes toward the classification as foreground if the nearby pixel location has significant contrast from the pixel location.

7. The method according to claim 1, wherein the method further comprises a step for learning a contrast function over an image sequence to determine its stable value for a reference background image using a statistical technique including a mixture of Gaussian distributions computed from the accumulation of ratios over time,
wherein the stable value includes contrast ratio between the pixel value at a pixel location and the pixel value of a nearby pixel location in a group of nearby pixel locations.

8. The method according to claim 1, wherein the method further comprises a step for learning a contrast function over an image sequence to determine its stable value for a reference background image by clustering time-accumulated ratios followed by an identification of large clusters which center around the value of a stable ratio,
wherein the stable value includes contrast ratio between the pixel value at a pixel location and the pixel value of a nearby pixel location in a group of nearby pixel locations.

9. The method according to claim 1, wherein the method further comprises steps of:
(a) comparing a first contrast between the pixel value at a first pixel location and the pixel value at a nearby pixel location in the reference background image with a second contrast between the pixel value at the first pixel location and the pixel value at the nearby pixel location in the current image in the image sequence,
(b) detecting a significant difference between the two contrasts as evidence that the first pixel location is occluded,
(c) accumulating the evidences for occlusion using a voting scheme for a given group of the nearby pixel locations in a circular configuration of a given radius around the first pixel location, and
(d) classifying the first pixel location to be occluded by an object at the current scale when sufficient number of occlusion evidences are gathered.

10. The method according to claim 9, wherein the method further comprises steps of:
(a) repeating the steps from (a) to (d) in claim 9 for a plurality of groups of nearby pixel locations around the first pixel location, in the circular configuration at multiple scales, and
(b) declaring the first pixel location to be occluded if the first pixel location is classified to be occluded in the analysis of any of the plurality of groups of nearby pixel locations at multiple scales.

11. The method according to claim 9, wherein the method further comprises a step for grouping contiguous occluded points and determining if there is an object crossing a region of interest.

12. An apparatus for detecting a scene event in an image sequence, comprising:
(a) means for generating a reference background image based on a multi-scale invariant analysis, wherein a multi-scale invariant is defined as multiple groups of pixel locations around a pixel location and the contrast between the pixel values of the multiple groups of pixel locations and the pixel value of the pixel location,
wherein each group of pixel locations is arranged in a circular configuration with a different radius,
(b) means for capturing an image sequence using an image capturing device,
(c) means for specifying one or a plurality of regions of interest as a plurality of contiguous pixel locations in said image sequence,
wherein each pixel location in the region of interest is associated with a classifier for the multi-scale invariant analysis,
(d) means for performing a classification of each pixel location in said plurality of contiguous pixel locations as background or foreground,
(e) means for defining a scene description as one or a plurality of said regions of interest each with its state of occlusion,
(f) means for defining said scene event as a sequence of the scene descriptions occurring over an image subsequence, and
(g) means for processing said image sequence to detect an occurrence of said scene event.

13. The apparatus according to claim 12, wherein said means for performing a classification further comprises:
(a) means for measuring the contrast of said pixel location with a group of nearby pixel locations, each having about the same constant distance from said pixel location, and
(b) means for comparing said contrast with the corresponding contrast in the reference background image computed during a learning period,
whereby said foreground is defined as an occlusion of said pixel location by a transient object including a person.

14. The apparatus according to claim 13, wherein the apparatus further comprises means for arranging said group of nearby pixel locations in a circular configuration with a constant radius from said pixel location.

15. The apparatus according to claim 12, wherein the apparatus further comprises means for applying a contrast function in the classification, wherein the contrast function takes a first pixel value at the pixel location and computes its contrast ratio with a second pixel value of a nearby pixel location of a group of nearby pixel locations and applying a threshold on the contrast ratio to perform the classification, whereby the contrast function enables a reliable said classification even with variations in lighting conditions.

16. The apparatus according to claim 12, wherein the apparatus further comprises means for including multiple groups of pixel locations in the classification, with each group of pixel locations having a different distance from the pixel location,
  wherein evidences for occlusion are accumulated using a voting scheme for each group of pixel locations,
  whereby the multiple groups of pixel locations enable a reliable said classification even if the pixel location is occluded by any transient object of different sizes.

17. The apparatus according to claim 12, wherein the apparatus further comprises means for performing the classification by a voting mechanism wherein each nearby pixel location of a group of nearby pixel locations votes toward the classification as foreground if the nearby pixel location has significant contrast from the pixel location.

18. The apparatus according to claim 12 wherein the apparatus further comprises means for learning a contrast function over an image sequence to determine its stable value for a reference background image using a statistical technique including a mixture of Gaussian distributions computed from the accumulation of ratios over time,
  wherein the stable value includes contrast ratio between the pixel value at a pixel location and the pixel value of a nearby pixel location in a group of nearby pixel locations.

19. The apparatus according to claim 12 wherein the apparatus further comprises means for learning a contrast function over an image sequence to determine its stable value for a reference background image by clustering time-accumulated ratios followed by an identification of large clusters which center around the value of a stable ratio,
  wherein the stable value includes contrast ratio between the pixel value at a pixel location and the pixel value of a nearby pixel location in a group of nearby pixel locations.

20. The apparatus according to claim 12, wherein the apparatus further comprises:
  (a) means for comparing a first contrast between the pixel value at a first pixel location and the pixel value at a nearby pixel location in the reference background image with a second contrast between the pixel value at the first pixel location and the pixel value at the nearby pixel location in the current image in the image sequence,
  (b) means for detecting a significant difference between the two contrasts as evidence that the first pixel location is occluded,
  (c) means for accumulating the evidences for occlusion using a voting scheme for a given group of the nearby pixel locations in a circular configuration of a given radius around the first pixel location, and
  (d) means for classifying the first pixel location to be occluded by an object at the current scale when sufficient number of occlusion evidences are gathered.

21. The apparatus according to claim 20, wherein the apparatus further comprises:
  (a) means for using the means from (a) to (d) in claim 20, multiple times, for a plurality of groups of nearby pixel locations around the first pixel location, in the circular configuration at multiple scales, and
  (b) means for declaring the first pixel location to be occluded if the first pixel location is classified to be occluded in the analysis of any of the plurality of groups of nearby pixel locations at multiple scales.

22. The apparatus according to claim 20, wherein the apparatus further comprises means for grouping contiguous occluded points and determining if there is an object crossing a region of interest.

* * * * *